(12) United States Patent
Webber et al.

(10) Patent No.: US 9,203,845 B2
(45) Date of Patent: Dec. 1, 2015

(54) PARENT MATCH

(75) Inventors: Jo Webber, Philadelphia, PA (US);
Pradeep Ittycheria, Philadelphia, PA (US)

(73) Assignee: VIRTUAL PIGGY, INC., Hermosa Beach, CA (US)

( * ) Notice: Subject to any disclaimer, the term of this patent is extended or adjusted under 35 U.S.C. 154(b) by 0 days.

(21) Appl. No.: 12/991,057

(22) PCT Filed: Sep. 3, 2010

(86) PCT No.: PCT/US2010/047790
§ 371 (c)(1),
(2), (4) Date: Apr. 8, 2011

(87) PCT Pub. No.: WO2011/028989
PCT Pub. Date: Mar. 10, 2011

(65) Prior Publication Data
US 2011/0185399 A1 Jul. 28, 2011

Related U.S. Application Data

(60) Provisional application No. 61/272,233, filed on Sep. 3, 2009, provisional application No. 61/272,235, filed on Sep. 3, 2009, provisional application No. 61/272,234, filed on Sep. 3, 2009, provisional application No. 61/272,232, filed on Sep. 3, 2009.

(51) Int. Cl.
*G06F 21/00* (2013.01)
*H04L 29/06* (2006.01)
*G06F 21/62* (2013.01)

(52) U.S. Cl.
CPC .............. *H04L 63/104* (2013.01); *G06F 21/62* (2013.01); *G06F 2221/2149* (2013.01)

(58) Field of Classification Search
CPC ... H04L 63/104; H04L 63/0407; G06F 21/62; G06F 2221/2149; H04M 3/38; H04M 1/72552; H04W 24/00; H04W 48/02; H04W 48/08; H04W 8/18
See application file for complete search history.

(56) References Cited

U.S. PATENT DOCUMENTS 5,262,943 A 11/1993 Thibado et al.
6,173,269 B1 1/2001 Soloki et al.
(Continued)

FOREIGN PATENT DOCUMENTS

JP 2006-526327 A 11/2006
JP 2007-510979 A 4/2007
(Continued)

OTHER PUBLICATIONS

IGN Staff, E3 2002: All About XBox Live, Full Blowout on Microsoft's Online Service Including Price, Launch Titles, and More, May 20, 2002.*
(Continued)

*Primary Examiner* — Kaveh Abrishamkar
*Assistant Examiner* — James J Wilcox
(74) *Attorney, Agent, or Firm* — Morgan Lewis & Bockius LLP

(57) ABSTRACT

A method of providing control preferences set by a person for a second person who is a prospective Internet user, the method comprising the steps of establishing a first account, the settings of the first account being stored in a database; establishing a second account, the settings of the second account being stored in the database; linking the first and second accounts such that control settings of the second account are determined through the first account; and viewing Internet content from the second account consistent with the control settings of the second account.

28 Claims, 7 Drawing Sheets

(56) References Cited

U.S. PATENT DOCUMENTS

| | | | |
|---|---|---|---|
| 6,397,256 B1 | 5/2002 | Chan et al. | |
| 6,785,824 B1* | 8/2004 | Grassle | 726/30 |
| 7,171,382 B2 | 1/2007 | Beacham | |
| 7,171,392 B2 | 1/2007 | Brookner et al. | |
| 7,302,272 B2* | 11/2007 | Ackley | 455/466 |
| 7,562,387 B2 | 7/2009 | Nguyen et al. | |
| 7,640,336 B1* | 12/2009 | Lu | G06Q 10/10 709/206 |
| 7,657,457 B2 | 2/2010 | Razumov | |
| 7,734,779 B1 | 6/2010 | Piccionelli | |
| 7,828,652 B2 | 11/2010 | Nguyen et al. | |
| 7,945,512 B2 | 5/2011 | Scipioni et al. | |
| 8,001,045 B1 | 8/2011 | McClinton | |
| 8,095,672 B1* | 1/2012 | Newstadt | G06F 21/40 705/75 |
| 8,116,726 B2* | 2/2012 | Richardson et al. | |
| 8,127,982 B1 | 3/2012 | Casey et al. | |
| 8,132,212 B2 | 3/2012 | Huegel | |
| 8,249,986 B2 | 8/2012 | Scipioni et al. | |
| 8,312,484 B1* | 11/2012 | McCarty et al. | 725/28 |
| 8,571,538 B2* | 10/2013 | Sprigg | H04W 4/001 455/410 |
| 8,676,619 B2* | 3/2014 | Lotvin | G06Q 30/02 705/14.4 |
| 9,043,928 B1* | 5/2015 | Paczkowski | H04L 63/10 713/1 |
| 2002/0049806 A1* | 4/2002 | Gatz | G06F 21/62 709/203 |
| 2002/0055911 A1 | 5/2002 | Guerreri | |
| 2002/0074397 A1 | 6/2002 | Matthews | |
| 2002/0120866 A1 | 8/2002 | Mitchell et al. | |
| 2003/0088490 A1 | 5/2003 | Beacham | |
| 2003/0154138 A1 | 8/2003 | Phillips et al. | |
| 2003/0204445 A1 | 10/2003 | Vishik et al. | |
| 2003/0233296 A1 | 12/2003 | Wagner | |
| 2004/0153421 A1 | 8/2004 | Robinson | |
| 2004/0215534 A1 | 10/2004 | Gautier et al. | |
| 2005/0038744 A1 | 2/2005 | Viijoen | |
| 2005/0039053 A1 | 2/2005 | Walia | |
| 2005/0044181 A1* | 2/2005 | Lee | 709/218 |
| 2005/0076367 A1* | 4/2005 | Johnson et al. | 725/58 |
| 2005/0102407 A1* | 5/2005 | Clapper | 709/228 |
| 2006/0069627 A1 | 3/2006 | Petersen et al. | |
| 2006/0161593 A1 | 7/2006 | Mori et al. | |
| 2006/0161669 A1 | 7/2006 | Mathew et al. | |
| 2006/0173792 A1 | 8/2006 | Glass | |
| 2006/0259778 A1 | 11/2006 | Gudorf et al. | |
| 2007/0118475 A1 | 5/2007 | Picciallo et al. | |
| 2007/0203954 A1 | 8/2007 | Vargas et al. | |
| 2007/0220494 A1 | 9/2007 | Spooner | |
| 2007/0245152 A1 | 10/2007 | Pizano et al. | |
| 2007/0250392 A1 | 10/2007 | Paulsen et al. | |
| 2007/0260603 A1 | 11/2007 | Tuscano et al. | |
| 2008/0004984 A1 | 1/2008 | Sendo et al. | |
| 2008/0033740 A1 | 2/2008 | Cahn et al. | |
| 2008/0148362 A1 | 6/2008 | Gilder et al. | |
| 2008/0168548 A1 | 7/2008 | O'Brien | |
| 2008/0228615 A1 | 9/2008 | Scipioni et al. | |
| 2008/0228637 A1 | 9/2008 | Scipioni et al. | |
| 2008/0228638 A1 | 9/2008 | Scipioni et al. | |
| 2008/0307339 A1 | 12/2008 | Boro et al. | |
| 2009/0043747 A1 | 2/2009 | Smith et al. | |
| 2009/0064302 A1 | 3/2009 | Colella | |
| 2009/0100184 A1* | 4/2009 | Chakra | G06F 21/554 709/229 |
| 2009/0112763 A1 | 4/2009 | Scipioni et al. | |
| 2009/0235086 A1 | 9/2009 | Lai et al. | |
| 2009/0281937 A1 | 11/2009 | Gupta et al. | |
| 2009/0292595 A1 | 11/2009 | Tonnison et al. | |
| 2009/0299841 A1 | 12/2009 | Bishop et al. | |
| 2010/0042912 A1* | 2/2010 | Whitaker | 715/212 |
| 2010/0114733 A1 | 5/2010 | Collas et al. | |
| 2010/0223184 A1 | 9/2010 | Perlman | |
| 2010/0285871 A1* | 11/2010 | Shah | G06F 21/552 463/29 |
| 2011/0010293 A1 | 1/2011 | Giordano et al. | |
| 2011/0047629 A1 | 2/2011 | Mitchell et al. | |
| 2011/0184855 A1 | 7/2011 | Webber et al. | |
| 2011/0185399 A1 | 7/2011 | Webber et al. | |
| 2011/0185400 A1 | 7/2011 | Webber et al. | |
| 2011/0237222 A1 | 9/2011 | Niejadlik | |
| 2012/0005582 A1 | 1/2012 | Webber et al. | |
| 2012/0022969 A1 | 1/2012 | Collas et al. | |
| 2012/0123865 A1 | 5/2012 | Salzano | |
| 2012/0171990 A1 | 7/2012 | Williams et al. | |
| 2012/0209768 A1 | 8/2012 | Nuzzi | |
| 2012/0209772 A1 | 8/2012 | Nuzzi et al. | |
| 2012/0259740 A1* | 10/2012 | Webber | G06Q 30/0601 705/27.1 |
| 2012/0259768 A1 | 10/2012 | Mukherjee | |
| 2012/0278202 A1 | 11/2012 | Webber et al. | |
| 2012/0278233 A1 | 11/2012 | Webber et al. | |
| 2012/0303523 A1 | 11/2012 | Webber et al. | |
| 2013/0018792 A1 | 1/2013 | Casey et al. | |
| 2013/0080323 A1 | 3/2013 | Scipioni | |
| 2013/0110670 A1 | 5/2013 | Webber et al. | |
| 2013/0110716 A1 | 5/2013 | Rekhi et al. | |
| 2013/0263001 A1* | 10/2013 | Doronichev | G06F 21/554 715/719 |
| 2014/0344951 A1* | 11/2014 | Brewer | G06F 3/0488 726/28 |

FOREIGN PATENT DOCUMENTS

| | | | |
|---|---|---|---|
| KR | 10-2002-0021515 A | 3/2002 | |
| KR | 10-0374296 | 2/2003 | |
| KR | 10-2003-0066494 | 8/2003 | |
| KR | 10-2003-0066494 A | 8/2003 | |
| KR | 10-2006-0103363 A | 9/2006 | |
| KR | 10-2008-0009175 A | 1/2008 | |
| WO | 00/36570 A1 | 6/2000 | |
| WO | 2004/089006 A2 | 10/2004 | |
| WO | 2011/028985 A2 | 3/2011 | |
| WO | 2011/028989 A2 | 3/2011 | |
| WO | 2011/028991 A2 | 3/2011 | |
| WO | 2011/028992 A2 | 3/2011 | |
| WO | WO2008101312 * | 5/2011 | G06F 17/00 |
| WO | 2008/101312 | 3/2013 | |

OTHER PUBLICATIONS

Content Watch Internet Protection "Net Nanny Parental Controls User Guide," 2007, ContentWatch Inc, pp. 1-83 retrieved from http://www.netnanny.com/assets/documentation/nn/netnanny_56.pdf.*
Notification of Transmittal of Search Report and Written Opinion of the International Searching Authority from the PCT dated Oct. 29, 2012 in a counterpart PCT application.
Notification of Transmittal of Search Report and Written Opinion of the International Searching Authority from the PCT dated Oct. 4, 2012 in a counterpart PCT application.
U.S. Office Action for U.S. Appl. No. 12/991,053, dated Sep. 19, 2013.
International Search Report (PCT/US2012/033022), Oct. 4, 2012.
International Search Report (PCT/US2012/033002), Oct. 29, 2012.
International Search Report (PCT/US2012/032998), Oct. 31, 2012.
International Search Report (PCT/US2010/047794), May 24, 2011.
International Search Report (PCT/US2010/047796), May 2, 2011.
IGN Staff (E3 2002: All About Xbox Live, Full Blowout on Microsoft's Online Service Including Price, Launch Titles, and More, May 20, 2002).
International Search Report (PCT/US2010/047785), Apr. 29, 2011.
Written Opinion (PCT/US2010/047785), Apr. 29, 2011.
International Preliminary Report on Patentability (PCT/US2010/047785), Mar. 6, 2012.
International Search Report (PCT/US2010/047790), Jun. 8, 2011.
Written Opinion (PCT/US2010/047790), Jun. 8, 2011.
International Preliminary Report on Patentability (PCT/US2010/047790), Mar. 6, 2012.
Written Opinion (PCT/US2010/047794), May 24, 2011.
International Preliminary Report on Patentability (PCT/US2010/047794), Mar. 6, 2012.

(56) References Cited

OTHER PUBLICATIONS

Written Opinion (PCT/US2010/047796), May 2, 2011.
International Preliminary Report on Patentability (PCT/US2010/047796), Mar. 6, 2012.
USPTO: Office Action for U.S. Appl. No. 13/431,256—Issued on Oct. 11, 2013.
U.S. Office Action for U.S. Appl. No. 13/567,610, dated Oct. 11, 2013.
Office Action dated Jan. 21, 2014, issued by the U.S. Patent & Trademark Office in U.S. Appl. No. 13/431,044.
USPTO—Notice of Allowance for U.S. Appl. No. 12/991,063—Issued on Oct. 21, 2013.
Notice of Allowance dated Feb. 25, 2014, issued by the U.S. Patent & Trademark Office in U.S. Appl. No. 13/247,572.
CIPO: Examination Report for Canadian Patent Application No. 2,772,399—Issued on Oct. 23, 2013.
Notice of Acceptance dated Jan. 7, 2015, issued by IP Australia in Australian Patent Application No. 2010289349.
Notice of Acceptance dated Dec. 12, 2014, issued by IP Australia in Australian Patent Application No. 2010289347.

* cited by examiner

FIG. 5

| Sign In | Friends | Preferred Content | Objectionable Content |

▽ Geographic Preferences
    North America
    Europe
  ✓ Asia
    Other

▽ Specific Countries
  China    :  −
  Taiwan  :  +

▽ Languages
  ✓ English
    Spanish
    French

▽ Category Preferences
    Science
    Mathematics
  ✓ Puzzle
    Historical
    Political
    Environmental ▽ Genres
  ✓ First Person Shooter
    Strategy
    Competitive
    Role Playing

FIG. 6

```
Function signup (input authorization code)
      {
            Return registration information
      }

Function getWordList(input authorization code)
      {
            Return worldList
      }

Function getWordListContext(input authorization code, context)
      {
            Return worldList
      }

Function allowCopy(input authorization code)
      {

Return True/False
            If true
            {
                  Return profile
            }
      }
```

FIG. 7

PARENT MATCH

This application claims the priority and benefit of U.S. Provisional Patent Application No. 61/272,233, U.S. Provisional Patent Application No. 61/272,235, U.S. U.S. Provisional Patent Application No. 61/272,234, and U.S. Provisional Patent Application No. 61/272,232, all of which were filed on Sep. 3, 2009 and are incorporated herein by reference.

CROSS-REFERENCE TO RELATED APPLICATIONS

This application is related to U.S. patent application Ser. No. 12/991,063, which claims the priority and benefit of U.S. Provisional Patent Application No. 61/272,235, which was filed on Sep. 3, 2009, and is incorporated herein by reference.

This application is related to U.S. patent application Ser. No. 12/991,059, which claims the priority and benefit of U.S. Provisional Patent Application No. 61/272,232, which was filed on Sep. 3, 2009, and is incorporated herein by reference.

This application is related to U.S. patent application Ser. No. 12/991,053, which claims the priority and benefit of U.S. Provisional Patent Application No. 61/272,233, which was filed on Sep. 3, 2009, and is incorporated herein by reference.

BACKGROUND OF THE INVENTION

1. Field of the Invention

The present invention relates to a system and method for providing parental control preferences, and more particularly to a system and method for providing parental control preferences that may be applied to any Internet application such that child users may view and/or register for their services.

2. Discussion of the Related Art

Children today have never known a world without the Internet. Children see their friends interacting and playing online and there is ever-increasing pressure on parents from their children to allow the children to be online. In numerous instances, children are not protected by media companies and are being placed in the extreme danger posed by online predators. Until measures are taken to provide a secure online environment for younger age groups, the online safety of children is compromised.

Generally, parental control systems fall under one of two categories. First, active parental control systems prevent a child from accessing information that the parent does not want them to access. For example, active parental control systems include programs such as hardware and software firewalls as well as hardware access controls tools or systems that prevent certain types of data from being presented to a user. Second, passive parental control systems allow parents to audit information that their children have been accessing and activities that their children engaged in while they were online, on a computer system, or on a managed or unmanaged network. For example, passive parental control systems include systems that audit user access and activity information in managed and unmanaged networks and present this information to parents.

With the increased penetration of the Internet, parents are more interested in knowing what their children are doing when they use a computer, including the websites they visit and the individuals with whom they are communicating. While active and passive controls help parents manage and control some of this information, there are no provisions for parents to control the types of services their children may sign up for on the web. Sign-up is a common step with web-based applications and Internet enabled desktop applications. The sign-up process allows users to register for services provided by web-based and Internet enabled desktop applications.

Active and passive parental control systems do not provide any support for being able to communicate and enforce parental preferences when it comes to sign-up of services on web-based and Internet enabled desktop applications. Broad classifications, such as Entertainment Software Rating Board ("ESRB") ratings, do not provide parents with the level of control they would like with respect to sign-up preferences for the children.

Very restrictive active and passive parental control systems, when used as a means of controlling the types of services children can access, will hamper the user experience for children and in many cases incorrectly restrict access to legitimate safe websites. For example, active control rules that prevent children from accessing sites that talk about words like "war" or "sex" could prevent children from accessing sites that present historical information about military wars or educational services that provide a lesson in biology as per an accepted curriculum. Without the ability to control context around words, such a mechanism would fail.

SUMMARY OF THE INVENTION

Accordingly, the present invention is directed to parental match that substantially obviates one or more problems due to limitations and disadvantages of the related art.

An embodiment of the present invention provides an improved system and method for controlling the types of information and activities that may be accessed in an Internet based application.

Another embodiment of the present invention provides a system and method for allowing parents or persons responsible for children to define a set of preferences relating to the types of information and activities that one or more children are allowed to access in an Internet based application.

Another embodiment of the present invention provides a system and method that provides filtering for parents or persons responsible for children such that the Internet based applications and activities conducted thereon may be controlled.

Of course, the present invention also encompasses a system and method that can be used by any individual to control activity on the Internet.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, the parent match system and method includes a method of providing control preferences for a prospective Internet user, the method comprising the steps of establishing a first account, the settings of the first account being stored in a database; establishing a second account, the settings of the second account being stored in the database; linking the first and second accounts such that control settings of the second account are determined through the first account; and viewing Internet content from the second account consistent with the control settings of the second account.

In another aspect, the parent match system and method includes a system providing control preferences for a prospective Internet user comprising a server; and a database hosted on the server, the database storing information for a first account and a second account; wherein control settings of the second account are established through the first account such that a viewing of Internet content from the second account is consistent with the control settings can be performed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 illustrates an exemplary preferences add child profile screen according to an exemplary embodiment of the present invention;

FIG. 6 illustrates an exemplary preferences set up screen according to an exemplary embodiment of the present invention; and FIG. 7 illustrates an exemplary segment of pseudo code for implementing the features of the present invention.

DETAILED DESCRIPTION OF THE INVENTION

Reference will now be made in detail to the embodiments of the present invention, examples of which are illustrated in the accompanying drawings.

In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented by any type of user (i.e., not limited to parent and child) and on any type of standalone system or client-server compatible system containing any type of client, network, server, and database elements. Wherever possible, like reference numbers will be used for like elements.

The following description uses as an example a parent as the person desiring to set controls regarding Internet use and a child as being the Internet user who will be controlled. These are only examples, and the invention is not limited to those two classes of people. For example, the following description would be equally applicable to an employer and employee.

At the outset, certain terms will be described.

A web-based system is a web-based or Internet enabled desktop software application. A web-based system is a software system that communicates with a server or backend system over the Internet. A web-based application is accessed by its users over the Internet. An Internet enabled desktop application may need its users to access its functionality in a browser.

Web service (also webservice), as defined by the W3C, is a software system designed to support interoperable machine-to-machine interaction over a network.

An application programming interface (API) is an interface that defines the ways by which an application program may request services from libraries and/or operating systems.

Figure 1:
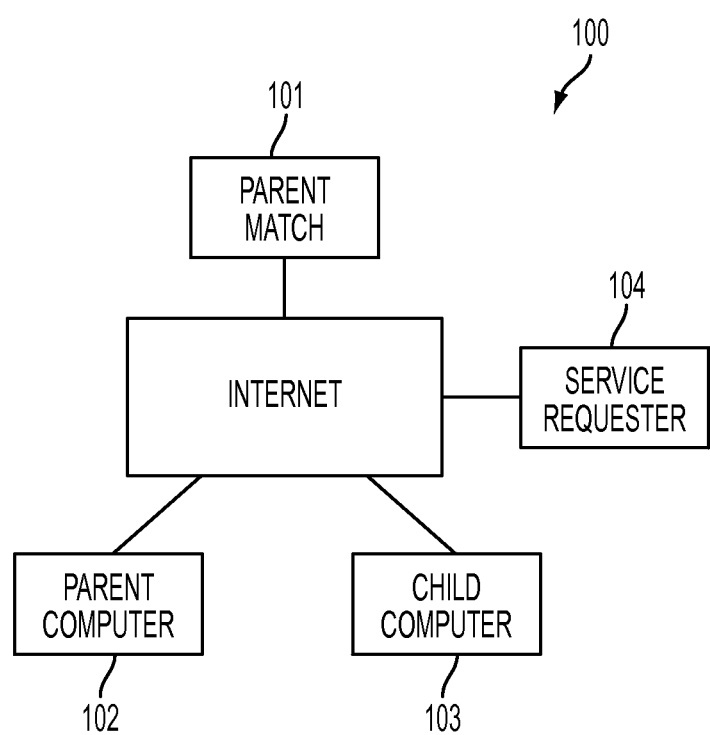
FIG. 1 illustrates a parent match system according to an exemplary embodiment of the present invention.

FIG. 1 illustrates a parent match system according to an exemplary embodiment of the present invention.

As shown in FIG. 1, the parent match system 100 includes a parent match server 101, parent computer 102, child computer 103, and service requester 104. The parent match server 101 may include a persistent software system and method for allowing parents or persons responsible for children to define a set of preferences controlling the types of information and activities that a child is allowed to access or perform on an Internet based application. A parental preferences system includes a database to store parental preferences and an application programming interface (API) layer that exposes software functions that an Internet based application can be utilized to enforce the parental preferences when a child tries to sign-up or register for and use their services. Each of the parent computer 102 and child computer 103 may be a desktop computer, laptop computer, tablet or portable computer, smartphone, mobile phone, or other portable computing device. Service requester 104 may include any Internet based application, such as a website, web application, or an Internet enabled desktop application, etc.

Figure 2:
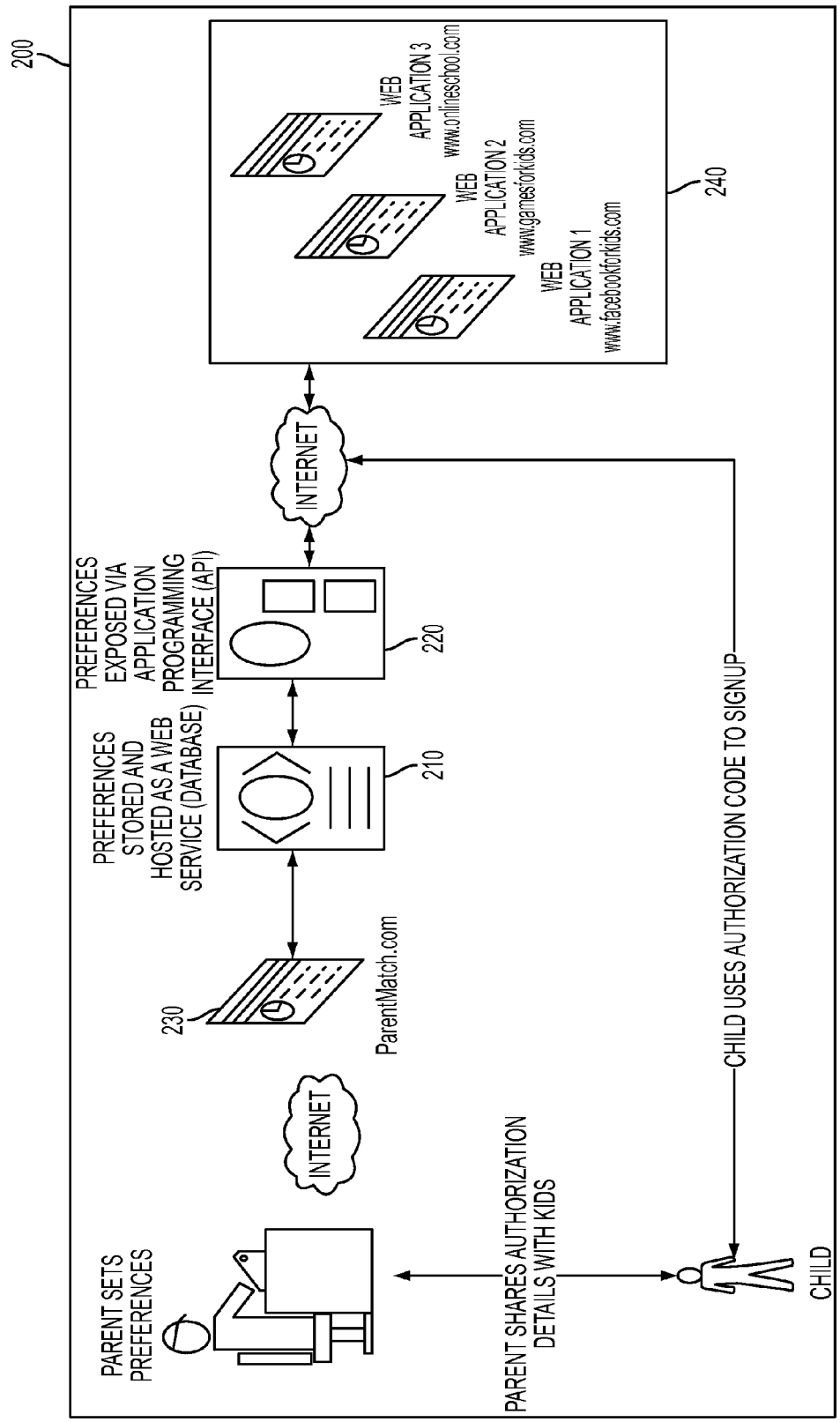
FIG. 2 illustrates an exemplary preferences system diagram according to an exemplary embodiment of the present invention.

FIG. 2 illustrates an exemplary preferences system diagram according to an exemplary embodiment of the present invention.

The preferences system 200 includes a database 210 to store parental preferences and an application programming interface (API) layer 220 that exposes software functions that Internet based applications can utilize to enforce the parental preferences when children try to sign-up or register for and use their services.

The preferences system 200 enables a process that allows parents to define their preferences in a generic and context sensitive fashion. In addition, the preferences system 200 uses these preferences to allow their children to sign-up and use a web-based system.

Preferences are defined for both information usage and activities. This is achieved using a database 210 of preferences, a user interface 230 to manage parental preferences, such as a website, and an application programming interface (API) that exposes those preferences to service requesters 240 that may want to solicit the participation of their children. The API 220 is exposed through a web service.

Data collected from the parents and stored in the database 200 will be protected in accordance with applicable data security and privacy laws and regulations. For example, provisions make the profile setup process fairly tamper proof so that a child may not setup a profile in the user interface 230. Provisions will be made around age verification (See U.S. patent application Ser. No. 12/991,063, System and Method for Verifying the Age of an Internet User, filed concurrently herewith, and incorporated by reference in its entirety), secure data communication and data encryption based on latest standards, such as 20-round RCS. Provisions will also be made to support multiple encryption standards that can work in isolation and in conjunction with each other to provide a higher degree of security. The data security and privacy laws referenced also include the Children's Online Privacy Protection Act ("COPPA").

Figure 3:
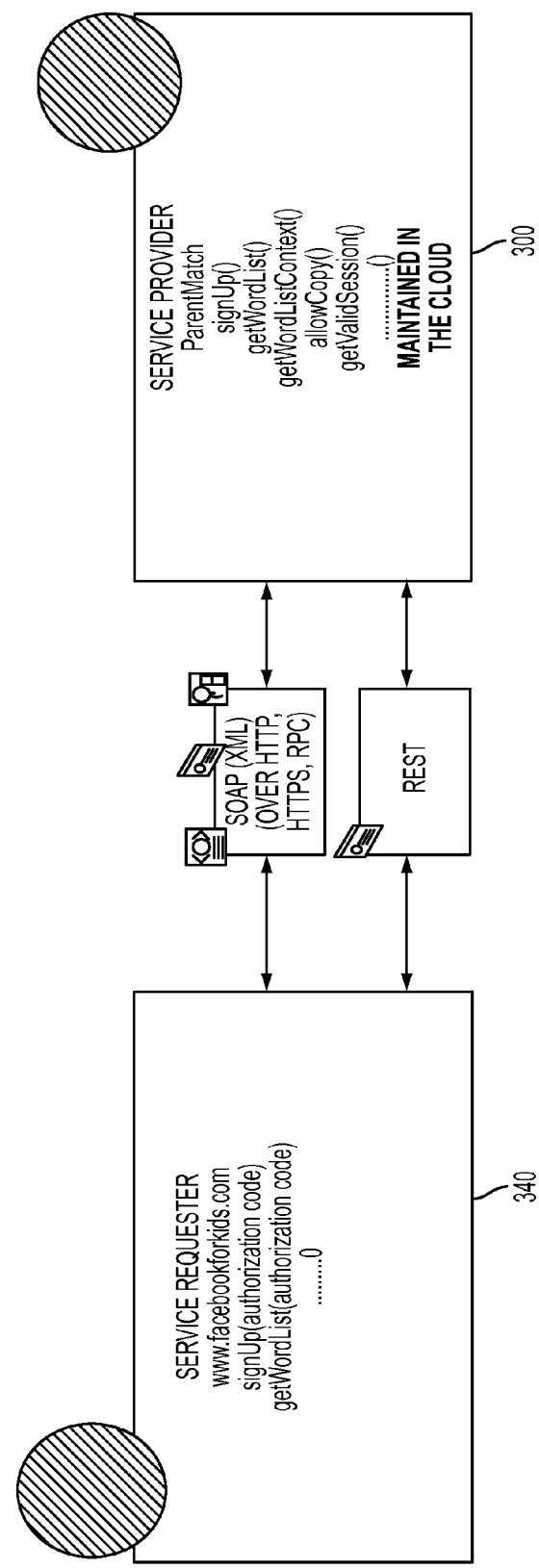
FIG. 3 illustrates an exemplary web service architecture according to an exemplary embodiment of the present invention.

FIG. 3 illustrates an exemplary web service architecture according to the present invention.

As shown in FIGS. 2 and 3, the service requester 340 is a web-based system that requests parental control information from the API 120 of the service provider 300 by making a web service call when a child tries to sign-up or register for or use their services. The service provider may be a hosted application. The service requester will be a web-based system or an Internet enabled desktop system that makes a web service request call over HTTP, HTTPS, RPC or one of the other prevalent web service communication protocols.

The API 120 is a well defined application programming interface with functions to authenticate the service requester 240, identify the user, acknowledge the request, secondary verification of the request, and management of security of all communication, among other functions. Additional functions around requesting stored preferences, such as approved word list, friends list, approved sites, etc., will be also provided as part of the API. Every preference category will be exposed via the API.

The service provider 300 is capable of responding to the requests of various service requestors 340. In addition, the service provider may either expressly limit certain service requestors 340 or apply limitations to all service requestors 340. For example, a preference limitation that does not allow a service requestor 340 to communicate explicit words to a child may be uniform across all service requestors.

The preferences in question will cover the following exemplary types of information (not an exhaustive list):

Sign up information—sign up to a website, web applications, and software application. Sign-up information includes the type of information that sites can and cannot ask for from the children.

Word set—the parent will be able to select words that cannot be delivered to their children as part of news, messages, ads, and other content services.

Context Sensitive Word Set—the parent will be able to provide context sensitive word sets. For example, children may be allowed to read about "sex" in a biology lesson, but not allowed to read about "sex" in other contexts.

Ads—the parent will be able to select types of ads that may be delivered to their children. The parent may also select if ads can or cannot be delivered their children.

Games—the parent may select types of games their children can and cannot play, such as massively multiplayer online games ("MMOG"), strategy, first person shooter ("FPS"), etc., plus the level of violence/nudity per standard game ratings.

Friends—the parent may select whether their children are allowed to make friends with people not in an approved friends list, select if their children can manage their friends list, select if their children can add or delete friends without parental override.

Applications—the parent may select types of applications (e.g., chat, message boards, picture libraries, games, third party applications) their children can or cannot be offered or signed up for.

Images—the parent may select types of images their children cannot view.

Content Preferences—the parent may select from a list of categories of the types of content they would like their children to be served. For example, an Indian parent may prefer to have his/her child be presented with facts about India.

Duration—the parent may select the amount of time and periods in a day children during which children are allowed to access a web-based system.

Reminders—parents can setup reminders designed to notify them about the occurrence of certain events. In addition, parents can select from a list of predefined triggers, or design custom triggers.

Profile copy—parents can select if their parent match profile may be copied to a service requester web system Expiry—parents can set an expiry date on the profile. After expiry of the profile, the corresponding authorization code will be unusable by the child and by web based systems.

Usage report—parents can setup preferences for the generation of periodic usage reports showing web based systems that have access to the parent match profile, date of first access, and last access.

Figure 4:
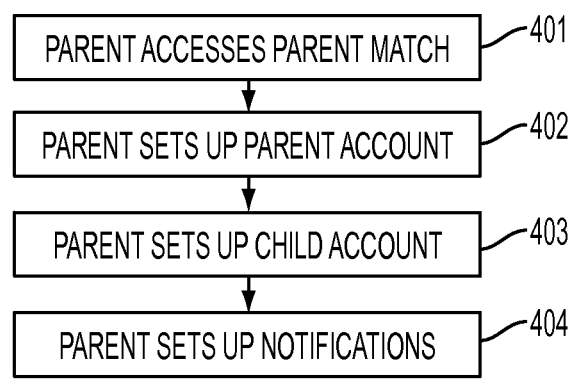
FIG. 4 is a flow chart illustrating a method for implementing a parent match system according to an exemplary embodiment of the present invention.

FIG. 4 is a flow chart illustrating a method for implementing a parent match system according to an exemplary embodiment of the present invention.

At step 401, a parent accesses the parent match system through the Internet to establish a parent match account. In order to establish a child account, a parent may first establish a parental account.

At step 402, a parent may establish a parental account. The patent match system may guide the parent through the set up of a parental account. To establish a parental account, a parent profile is created. A parent profile allows a parent to provide information that allows the parent match system to interact with a parent. For example, the parent match system may support OpenID. A parent may be able to use an OpenID account to establish a parent profile. However, the parent match system may request additional information as well, such as a password, name (first, middle and last), address information, verification preference such as e-mail or short message service (SMS) that is used to verify a parental account, primary phone number, mobile phone number that may be used if SMS is selected as a verification preference so that SMS messages may be sent to a mobile phone, a primary e-mail address that may be used if e-mail is selected as verification preference, secondary e-mail, password reminder questions, and time-zone such that dates and times in the parent match system are based on this time-zone and not the time-zone of the server.

The parental account is secure and can only be accessed with the correct user name and password. All data transmissions may be encrypted and secure, such as all profile information. Passwords that may be used by the parent, child or others designated to properly use the system may have expiration dates to insure password strength. After a parental account is established, a parent may then establish one or more child accounts. The settings of a child account may then be controlled by the parental account. For example, the parent match system may present a number of options from which a parent may choose such that various controls may be imposed on a child by the parent match.

At step 403, one or more child accounts also may be established. Account information, such as a user name, password, may be stored in a secure database by the parent match server. To establish a child account, a child profile is created. A child profile may include a user name, password, and payment method, such as a payment account. A child may use the user name and password to view websites, online games and online applications that are approved by a parent through the parent match system. Also, a child may send websites, games and friends to their parents for approval.

Also, a child may add items to a wish-list, and a parent may review and approve items on a child's wish-list. A parent may either buy or remove an item from a child's wish-list. The wish-list may be customized. For examples, items in a wish-list may expire and be removed from the wish-list based on the settings of the wish-list.

In addition, the patent match system may allow a parent to customize a child profile. The parent match system may allow a parent to impose one or more controls on a child by setting up a child profile. A child profile may include a list of approved websites (i.e., Service Requester of FIGS. 1 and 2) that a child is authorized to view. A viewing time limit may limit the amount of time that a child can view one or more websites without obtaining parental approval, or a periodic viewing time limit that limits the amount of time a child may view one or more websites on a periodic basis such as per week, per month, or over any particular time limit. Alternatively, a parent may set a viewing time limit that limits the amount of time a child can view one or more websites on an occasional basis, such as after a child has completed his or her homework. Similarly, the parent match system also may allow a parent to specify a time period during which a child may view websites. For example, a time period may be certain hours of the day, certain days of the week, or any period so desired.

At step 404, the parent match system may allow a parent to setup specific notifications. For example, a parent may request a notification if more than a certain number of hours is spent at a particular service requester. Such notifications may include any information regarding the child account. For example, a parent may receive a notification concerning a child's request to view a new website that has not yet been approved by a parent. In another example, a parent may receive a notification concerning a child's request to add a friend on a social networking site, such as Facebook.

Notifications may be sent by e-mail, SMS, voicemail, or the like. In the above examples, a reply SMS message or e-mail may be sent by a parent or contributor to approve a particular request. Alternatively, the parent match system may provide one or more links that may be clicked upon to approve or decline a particular transaction. If a notification is provided by phone, a request for approval may be requested after the recital of an automated message, and approval may be solicited through key selection.

In addition, the parent match system may generate activity reports for a parent's review. Such reports may be viewed by logging into the parent match system, or may be sent on a periodic basis to a parent by e-mail. Alternatively, the parent match system may generate customized reports based upon a parent's request. For example, a parent may request a report for a particular date or type of website (e.g., a social networking site). In another example, a Usage Report by Child may illustrate all details of all websites, games, social networking sites visited by a child account. The report may include dates, amount of time spent per Internet application, list of websites, online games, and other Internet applications, and sub-totals for each day, week, month or period. In yet another example, an Action Report by Application may illustrate all actions performed by a child a child account on a particular Internet applications and would also include an activity date and amount, as well as sub-totals for each day, week, month or period.

Although not shown, a service requester may establish a service requester account with the parent match system. For example, the parent match system may support OpenID. A service requester may use their OpenID account to setup a service requester account. A service requester account allows a service requester to provide information to the parent match system. Such information may include the type of content provided by the service requester, a recommended age for users viewing such content, and other information that may be used to assist in determining whether a child should be allowed to access the content.

Figure 5:
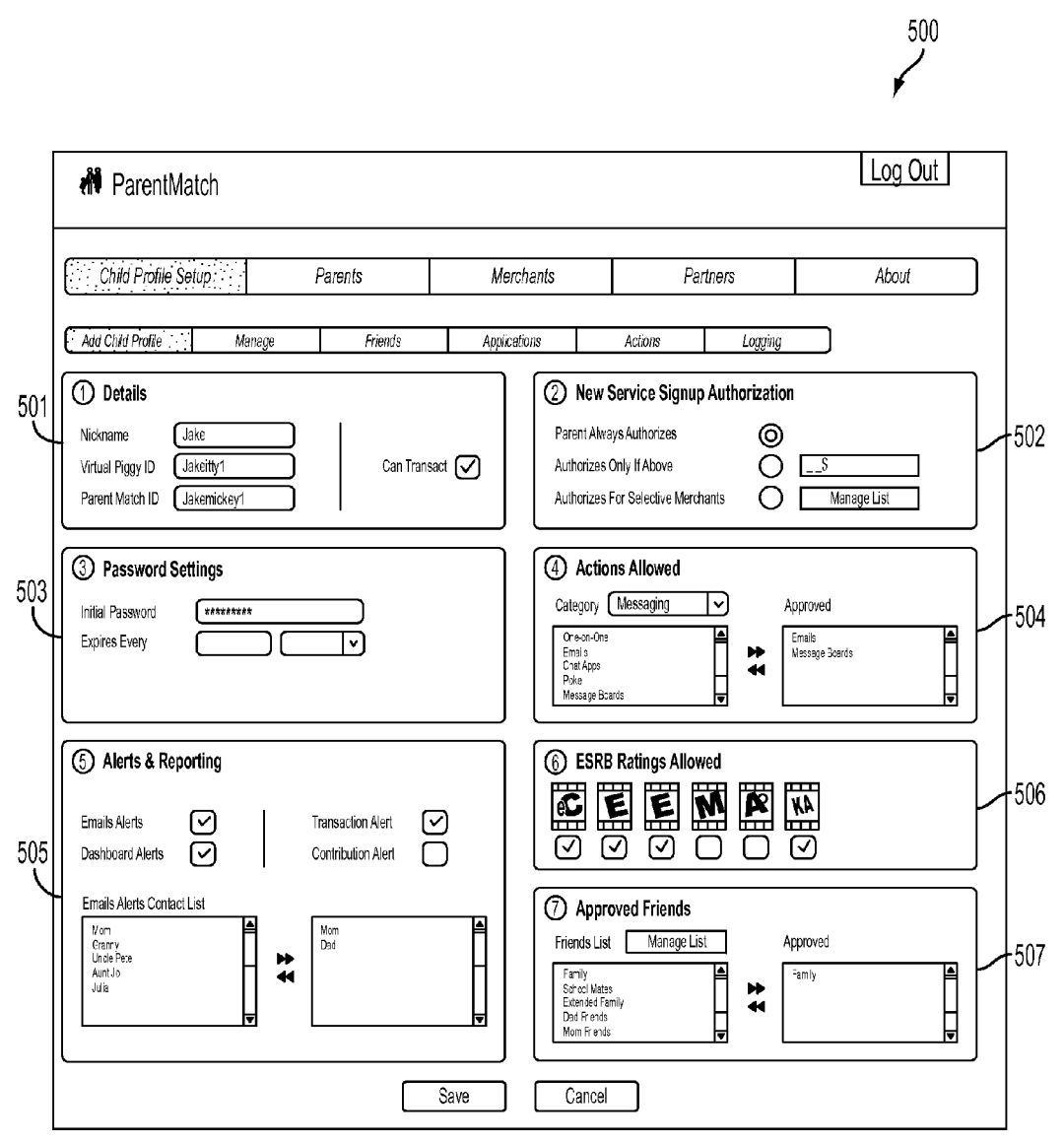

FIG. 5 illustrates an exemplary preferences add child profile screen according to an exemplary embodiment of the present invention.

As shown in FIG. 5, the add profile screen 500 may be divided into several exemplary screen portions 501-507. At screen portion, 501 a parent may identify a child by name or nickname. Also, a child may be given a child account user name that is associated with a parent account user name.

At screen portion 502, a parent may authorize new services, such as websites, that a child may visit, from which a child may make purchases, etc. The parent can control if every new service needs to be approved by the parent. The parent can also selectively define which services need to be approved while all other services can be automatically approved.

At screen portion 503, a parent may establish a password for a child account. A password may be assigned a password expiry date that may be selected by a parent. After the password expiry date, a child would no longer be able to access the child account. Alternatively, the child account may not be assigned a password expiry date.

At screen portion 504, a parent may authorize certain applications for use by a child, such as chat message boards, games, etc. For an application category like messaging the parent can control specific messaging actions such allowing as one on one, group, message boards to name a few. The same would apply to other application categories.

At screen portion 505, a parent may specify that notifications be sent for any information regarding the child account. Notifications may be sent by e-mail, SMS, voicemail, or the like. In addition, a parent may specify that notifications be sent to other persons such as another parent, grandparent, aunt, uncle, or other adult responsible for a child. Alerts could be sent for actions the child performs such as signing up for a new service, adding a new friend, being added as a friend by someone else, visiting a certain site among others.

At screen portion 506, a parent may designate approved ESRB ratings for websites and other online applications that a child may attempt to access.

At screen portion 507, a parent may designate persons that a child may be friends with on a social networking site, such as Facebook. Alternatively, a parent may approve a child's request to add a friend on a social networking site on an individual basis. For example, a parent may receive a notification concerning a child's request to add a friend on a social networking site.

FIG. 6 illustrates an exemplary preferences set up screen according to an exemplary embodiment of the present invention. As shown in FIG. 6, a parent may limit the information which a child may access. For example, a child may only be allowed to access information originating from Asia, or from specific countries. Also, a child may only be allowed to access information in the English language. In addition, a parent may allow a child to access contents relating to science, mathematics, puzzles, or other types of information. In each of these cases, the parent establishes a preference, or combination of preferences, that determines the type of information communicated to the child.

FIG. 7 illustrates an exemplary segment of pseudo code for implementing the features of the present invention. The parent match system and method includes a parental preferences system, including a database to store parental preferences and an Application Programming Interface (API) layer that exposes software functions that web sites, web services and internet enabled desktop application can utilize to enforce the parental preferences when children try to sign-up or register for and use their services.

It will be apparent to those skilled in the art that various modifications and variations can be made in the patent match of the present invention without departing form the spirit or scope of the invention. Thus, it is intended that the present invention cover the modifications and variations of this invention provided they come within the scope of the appended claims and their equivalents.

What is claimed is:

1. A computer-implemented method of providing control preferences for a prospective Internet user, the method comprising:
   establishing, by a first user at a first server computer, by logging into a parent match system hosted on the first server computer with a first login, a first account associated with the first login hosted in the parent match system on the first server computer, settings of the first account being stored in a database in the first server computer, the first user being associated with the first account;
   establishing, by the first user via the first account in the parent match system hosted on the first server computer, a second account associated with a second user, settings of the second account being set only by the first user via the first account login and stored in the database, the first account comprising a first set of preferences, the second account and second user being different from the first account and first user;
   linking the first and second accounts such that the settings of the second account are determined by the first user through the first account, the settings of the second account comprising a second set of preferences; and
   viewing, from a content provider server computer, Internet content by the second user associated with the second account consistent with the settings of the second account that were determined by the first user through the first account,
   wherein the settings of the second account include context sensitive word sets for selective contextual information to be delivered, the context sensitive word sets including one or more words that are acceptable for content within a selected context approved by the first user, such that the second user is allowed to read about the one or more words in an approved context, but is not allowed to read about the one or more words in a disapproved context, and
   wherein the settings of the second account further include one or more of the following preferences: selective ads to be delivered, selective categories and intensities of online video games to be delivered, selective cultural content to be delivered, sign-up information, a parent match profile to be copied to a service requester web system, reminders for the first user triggered by a predetermined event or metric, and a parent match profile may be set to expire at a predetermined time thereafter making access by the second user impossible.

2. The method of providing control preferences for a prospective Internet user according to claim 1, wherein the settings of the second account include a list of approved service requesters that may be viewed by the second user associated with the second account.

3. The method of providing control preferences for a prospective Internet user according to claim 1, wherein the viewing Internet content further includes notifying the first user associated with the first account.

4. The method of providing control preferences for a prospective Internet user according to claim 3, wherein the notifying the first user associated with the first account is performed by e-mail or short message service.

5. The method of providing control preferences for a prospective Internet user according to claim 1, wherein account information for the first and second accounts is stored in a secure database.

6. The method of providing control preferences for a prospective Internet user according to claim 1, wherein at least one of the first user associated with the first account and the second user associated with the second account uses a mobile device.

7. The method of providing control preferences for a prospective Internet user according to claim 1, wherein the context sensitive word sets further include contextual information which is disapproved by the first user that is prohibited from being included in the Internet content.

8. The method of providing control preferences for a prospective Internet user according to claim 1, wherein the settings of the second account include allowing selective ads to be delivered.

9. The method of providing control preferences for a prospective Internet user according to claim 1, wherein the settings of the second account include allowing selective categories and intensities of online video games to be delivered.

10. The method of providing control preferences for a prospective Internet user according to claim 1, wherein the settings of the second account include allowing selective cultural content to be delivered.

11. The method of providing control preferences for a prospective Internet user according to claim 1, wherein the settings of the second account include sign-up information.

12. The method of providing control preferences for a prospective Internet user according to claim 1, wherein the settings of the second account include reminders for the first user triggered by a predetermined event or metric.

13. The method of providing control preferences for a prospective Internet user according to claim 1, wherein the settings of the second account include allowing a parent match profile to be copied to a service requester web system.

14. The method of providing control preferences for a prospective Internet user according to claim 13, wherein the parent match profile is set to expire at a predetermined time thereafter making access by the second user impossible.

15. A system providing control preferences for a prospective Internet user having a non-transitory computer readable medium including a program and a computer executable program code, comprising:
   a server computer; and
   a database hosted on the server computer, the database configured to store information for a first account and a second account, the first and second accounts being established by a first user, the first and second accounts being different from each other, the first account being established by logging into a parent match system hosted on the server computer with a first login, the first account being associated with the first login hosted in the parent match system on the server computer, settings of the first account being stored in a database in the server computer, the first user being associated with the first account, the second account being established by the first user via the first account in the parent match system hosted on the server computer, the second account being associated with a second user, settings of the second account being set only by the first user via the first account login and stored in the database, the first account comprising a first set of preferences, the second account and second user being different from the first account and first user, the first and second accounts being linked such that the settings of the second account are determined by the first user through the first account, the settings of the second account comprising a second set of preferences; and a display configured to display, at a location of the second user, Internet content selected the second user associated with the second account, the Internet content being associated with a content provider server computer, the Internet content being consistent with the settings of the second account determined by the first user through the first account, wherein the settings of the second account include context sensitive word sets for selective contextual information to be delivered, the context sensitive word sets including one or more words that are acceptable for content within a selected context approved by the first user, such that the second user is allowed to read about the one or more words in an approved context, but is not allowed to read about the one or more words in a disapproved context, and wherein settings of the second account further include one or more of the following preferences: selective ads to be delivered, selective categories and intensities of online video games to be delivered, selective cultural content to be delivered, sign-up information, a parent match profile to be copied to a service requester web system, reminders for the first user triggered by a predetermined event or metric, and a parent match profile may be set to expire at a predetermined time thereafter making access by a second user impossible, are established through the first account such that a viewing of Internet content by the second user of the second account is consistent with the control settings of the second account, the control settings being established only by the first user.

16. The system providing control preferences for a prospective Internet user according to claim 15, wherein the control settings include a list of approved service requesters that may be viewed by the second user associated with the second account.

17. The system providing control preferences for a prospective Internet user according to claim 15, wherein the first user associated with the first account is notified when the second user associated with the second account views Internet content.

18. The system providing control preferences for a prospective Internet user according to claim 15, wherein the first user associated with the first account is notified by e-mail or short message service.

19. The system providing control preferences for a prospective Internet user according to claim 15, wherein account information for the first and second accounts is stored in a secure database.

20. The system providing control preferences for a prospective Internet user according to claim 15, wherein at least one of the first user associated with the first account and the second user associated with the second account uses a mobile device.

21. The system providing control preferences for a prospective Internet user according to claim 15, wherein the context sensitive word sets further include contextual information which is disapproved by the first user that is prohibited from being included in the Internet content.

22. The system providing control preferences for a prospective Internet user according to claim 15, wherein the control settings of the second account include allowing selective ads to be delivered.

23. The system providing control preferences for a prospective Internet user according to claim 15, wherein the control settings of the second account include allowing selective categories and intensities of online video games to be delivered.

24. The system providing control preferences for a prospective Internet user according to claim 15, wherein the control settings of the second account include allowing selective cultural content to be delivered.

25. The system providing control preferences for a prospective Internet user according to claim 15, wherein the control settings of the second account include sign-up information.

26. The system providing control preferences for a prospective Internet user according to claim 15, wherein the control settings of the second account include reminders for the first user triggered by a predetermined event or metric.

27. The system providing control preferences for a prospective Internet user according to claim 15, wherein the control settings of the second account include allowing a parent match profile to be copied to a service requester web system.

28. The system providing control preferences for a prospective Internet user according to claim 27, wherein the parent match profile is set to expire at a predetermined time thereafter making access by the second user impossible.

* * * * *